Patented Aug. 3, 1948

2,446,453

UNITED STATES PATENT OFFICE 2,446,453

PROCESS OF PREPARING ACETONE-CHLOROFORM

Ernst Bergmann, London, England, assignor, by mesne assignments, to Polymerisable Products Limited, London, England, a British company No Drawing. Application November 17, 1943, Serial No. 510,700

6 Claims. (Cl. 260—633)

The present invention deals with an improvement in the production of acetone-chloroform (i.e. trichloro-tertiary butyl alcohol).

Acetone-chloroform which is used as a drug (against sea-sickness) and as a starting material for certain industrial processes (e.g., the manufacture of alkoxy-isobutyric acids), has heretofore been made from acetone and chloroform by treatment of a mixture of these with an alkaline condensing agent, e.g., potassium hydroxide, which gives the alkali metal salt of that tertiary alcohol. The yields obtained with the most commonly proposed agent, potassium hydroxide, are however, very poor, e.g., about 15% of the theoretical. I have now found that the complex between potassium hydroxide and certain organic solvents, namely acetals and ethylene gylcol dialkyl ethers (which can be produced as shown in Serial Number 493,301, now abandoned, or by any other suitable method) is surprisingly efficient in bringing about that condensation. The yields rise to 75-85% of theory, as set out below. The reaction has to be carried out in the neighborhood of 0° C., and it is preferable to discontinue the treatment when the conversion has reached about 85%. This prevents undue dehalogenation of the organic chlorine compounds, and the unreacted acetone and chloroform can be recovered and reused in subsequent runs of the process.

The potassium hydroxide employed is nearly all recovered in the form of an aqueous solution of about 30% concentration, by treating the reaction product with an appropriate amount of ice or ice water, thus hydrolysing the potassium salt of the trichloro tertiary butyl alcohol. The mixture is then allowed to stand, forming two layers which can be separated. From the said aqueous solution the solid potassium hydroxide can be recovered in the usual way, e.g., by distilling off the water in the presence of appropriate organic solvents.

For more fully explaining the invention, I give the following example, without restricting the invention to the details thereof.

One liter of acetal is cooled to 0° C. in a four-necked flask (provided with a stirrer, a dropping funnel, a thermometer and a condenser), and 240 g., of powdered potassium hydroxide of 87% purity were slowly added, the temperature being kept at 0° C. by cooling. The reaction is exothermic. This forms a complex of the KOH with acetal, in an excess of the latter. When all the potassium hydroxide has been added the mixture is stirred for an hour and 220 c.c., of acetone and 240 c.c., of chloroform (previously mixed) are added slowly, while continuing the cooling so that the temperature of the mixture does not rise above 5° C. The mixture is stirred for another two hours, and the reaction products are treated with 1 kg., of ice. This produces a reaction between the potassium derivative of trichloro tertiary butyl alcohol and water, liberating the alcohol and forming potassium hydroxide solution in water. The mixture is then allowed to settle into two layers, the bottom layer being the aqueous potassium hydroxide solution (also containing some potassium chloride) and the upper layer being the organic compounds.

The bottom layer may be brown in color and can be concentrated or evaporated to dryness and used in a subsequent run of the process. The potassium chloride can be disregarded because it does not interfere with the reaction.

The organic layer may be dried, e.g., with calcium chloride, and fractionally distilled. One can thus recover 33 c.c., of acetone, 36 c.c., of chloroform, and the acetal employed (at 56, 63 and 102° C., respectively). The residue is then steam-distilled. The acetone-chloroform is thus obtained in a white crystalline form, and is filtered and dried. Yield, 340 g. It should be noted that the product crystallises very easily and is apt to clog the condenser and accordingly the cooling water should not be too cold.

The drying of the organic layer is optional and would ordinarily be omitted when operating on a commercial scale.

A number of experiments were carried out looking toward the utilization of the potassium compound of the alcohol, direct. It appeared that it might be possible to directly treat the solid condensation product, assuming this to be a mixture of the potassium derivative of acetone-chloroform $CCl_3.C(OK).(CH_3)_2$ and excess potassium hydroxide. Such a process, however, was found not to be feasible because the separation of the somewhat slimy solid material is mechanically difficult, and because of the fact that a substantial part of the product (either as such or as its potassium derivative) remains in the liquid phase. The acetone-chloroform accordingly has to be isolated as such.

It will be understood that in place of acetal, homologues of this, or dialkyl ethers of ethylene glycol or of its homologues, can be similarly employed. The amount of such solvents can vary between wide limits. Such bodies contain in their molecule two ether-forming oxygen atoms separated from each other by at least one and not more than two carbon atoms, i.e.,

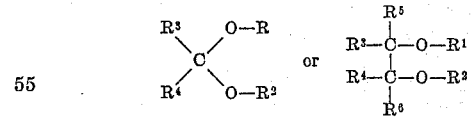

In these formulas $R^1$ and $R^2$ are alkyl groups, and $R^3$, $R^4$, $R^5$ and $R^6$ are hydrogen atoms or alkyl groups. Also in the body phenyl-ethylene-glycol-diethyl-ether, $R^3$ is a phenyl group and $R^4$, $R^5$ and $R^6$ are hydrogen atoms, $R^1$ and $R^2$ being ethyl groups.

As examples of suitable solvents, which form stable complexes with potassium hydroxide, I mention the following:

Acetaldehyde-dipropyl-acetal
Acetaldehyde-dibutyl-acetal
Butyraldehyde-dimethyl-acetal
Butyraldehyde-dibutyl-acetal
Formaldehyde-ethylene-glycol-acetal
Acetaldehyde-ethylene-glycol-acetal
Acetone-ethylene-glycol-ketal
Methyl-ethyl-ketone-ethylene-glycol-ketal
Ethylene-glycol-ethyl-butyl-ether
Ethylene-glycol-diethyl-ether
Ethylene-glycol-dibutyl-ether
Propylene-glycol-diethyl-ether
Phenyl-ethylene-glycol-diethyl-ether Using these other solvents, the same procedure is to be followed, and the same temperature conditions for the condensation are observed, as with acetal, but the distillation temperature of the solvent will, of course, be different.

Obviously, the application is not limited to the system acetone and chloroform, but is meant to include bromoform, and those ketones which are capable of combining in the same manner as acetone with these trihalogeno-methanes. The tendency to such condensation is often expressed in the strongly positive heat evolved in simply mixing the two components.

I claim:

1. A process of making acetone-chloroform which comprises reacting acetone and chloroform on each other, at a temperature not substantially above 5° C., in the presence of a solvent liquid which is an organic substance containing in its formula two ether-forming oxygen atoms separated from each other by at least one and not more than two carbon atoms and in the presence of a complex of potassium hydroxide with such an organic substance, which complex is in the solid state.

2. A process for making acetone-chloroform which comprises reacting acetone, chloroform and potassium hydroxide on each other, at a temperature not substantially above 5° C., in the presence of an acetal and a solid complex of an acetal with KOH.

3. A process of making acetone-chloroform which comprises reacting acetone, chloroform and potassium hydroxide on each other, at a temperature not substantially above 5° C., in the presence of a solvent which is an organic substance containing in its formula two ether-forming oxygen atoms separated from each other by at least one and not more than two carbon atoms, then adding very cold water to the reaction product, separating into an aqueous layer and an organic layer, and fractionally distilling the organic layer to recover unreacted acetone and chloroform, and the said solvent, and steam-distilling the acetone-chloroform.

4. A process of making an addition product of a ketone and a body of the formula $CHX_3$ in which X is a halogen element selected from the group consisting of chlorine and bromine, which process comprises first forming a fluent mixture capable of being stirred, from solid potassium hydroxide and a liquid dialkyl ether of a glycol, said dialkly ether being in excess over 1 mole per mole of KOH, to form a suspension of a complex of KOH with said dialkyl ether suspended in an excess of said dialkyl ether, and maintaining said suspension at a temperature below 5° C., while adding the ketone and the $CHX_3$ to said suspension, continuing the stirring after the completion of the addition of the mixture of the ketone and the $CHX_3$ to allow sufficient progress of the reaction, then mixing the reaction product with water at about ice temperature to decompose the potassium derivative of the halogenated alcohol produced.

5. A process of making an addition product of an aliphatic ketone and a body of the formula $CHX_3$ in which X is a halogen element selected from the group consisting of chlorine and bromine, which process comprises first forming a fluent mixture capable of being stirred, from potassium hydroxide and a solvent which is an organic substance containing in its formula two ether-forming oxygen atoms separated from each other by at least one and not more than two carbon atoms, thereby forming a solid complex of potassium hydroxide with said organic substance, said organic substance being in excess over 1 mole per mole of KOH, to form a suspension of said complex suspended in an excess of said liquid substance, and maintaining said suspension at a temperature below 5° C., while adding the ketone and the $CHX_3$ to said suspension, continuing the stirring after the completion of the addition of the mixture of the ketone and the $CHX_3$ to allow sufficient completion of the reaction, then mixing the reaction product with very cold water to decompose the potassium derivative of the alcohol produced.

6. A process of making an addition product of acetone and a body of the formula $CHX_3$ in which X is a halogen element selected from the group consisting of chlorine and bromine, which process comprises first forming a fluent mixture capable of being stirred, from solid potassium hydroxide and phenyl ethylene glycol dialkyl ether, the latter being in excess over 1 mole per mole of KOH, to form a suspension of a complex of KOH with said dialkyl ether, suspended in an excess of said dialkyl ether, and maintaining said suspension at a temperature below 5° C., while adding the acetone and the $CHX_3$ to said suspension, continuing the stirring after the completion of the addition of the mixture of acetone and the $CHX_3$ to allow sufficient completion of the reaction, then mixing the reaction product with water at about ice temperature, to decompose the potassium derivative of the alcohol produced.

ERNST BERGMANN.

REFERENCES CITED

The following references are of record in the file of this patent:

UNITED STATES PATENTS

| Number | Name | Date |
|---------|---------|---------|
| 761,189 | Aldrich | May 31, 1904 |
| 777,712 | Aldrich | Dec. 20, 1904 |
| 2,161,191 | Perkins | June 16, 1939 |
| 2,345,170 | Zeltner | Mar. 28, 1944 |

FOREIGN PATENTS

| Number | Country | Date |
|---------|---------|---------|
| 515,539 | Germany | Jan. 13, 1931 |